Aug. 25, 1942.     J. S. MORREL     2,294,198
VOLUME MEASURING APPARATUS
Filed Jan. 19, 1939     3 Sheets-Sheet 1
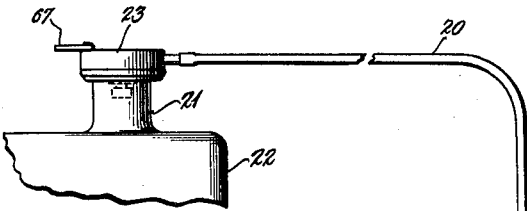
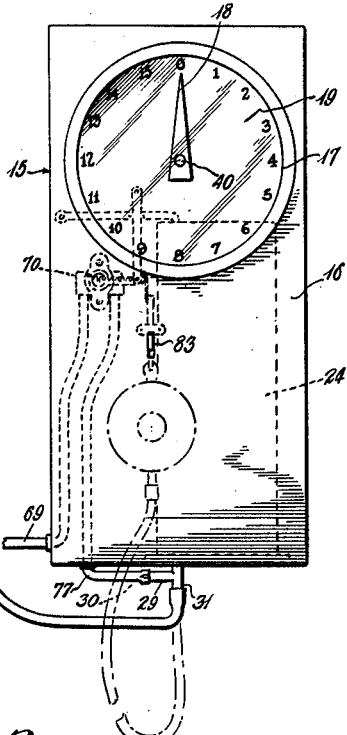
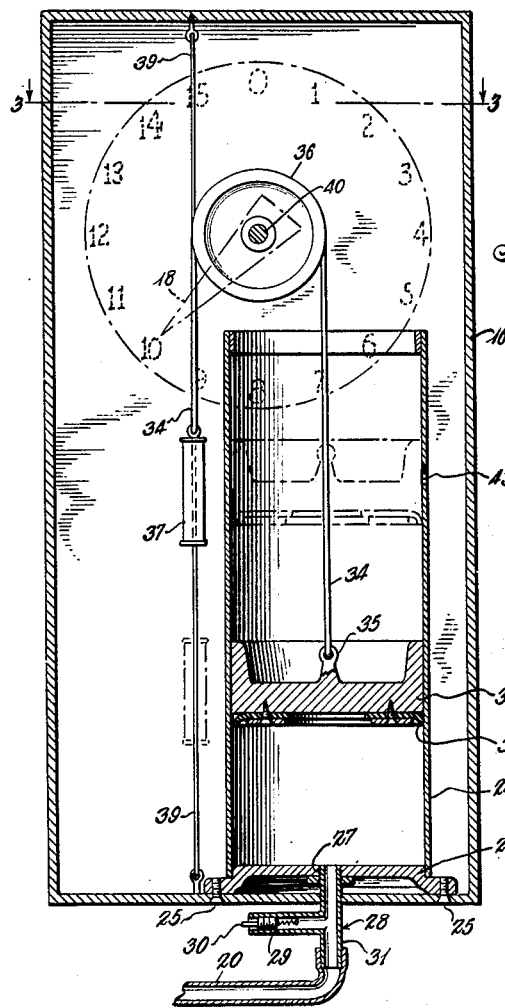
Inventor
John S. Morrel
By James P. Burns
Attorney Aug. 25, 1942.  J. S. MORREL  2,294,198
VOLUME MEASURING APPARATUS
Filed Jan. 19, 1939  3 Sheets-Sheet 2
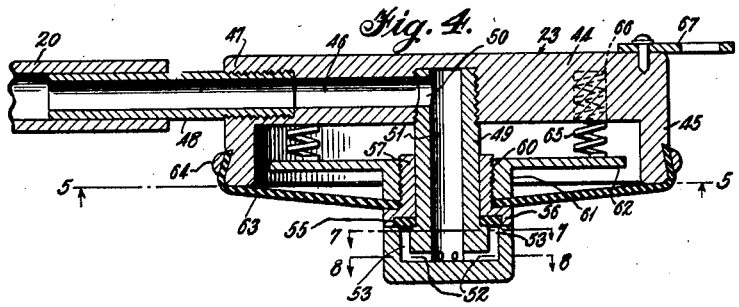
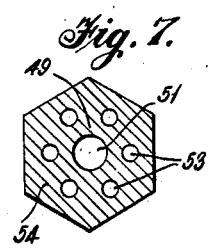
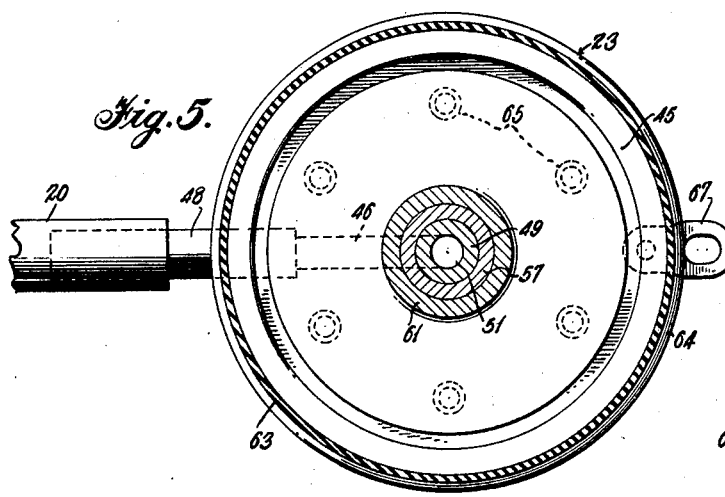
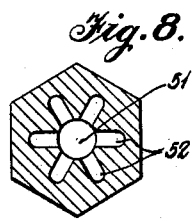
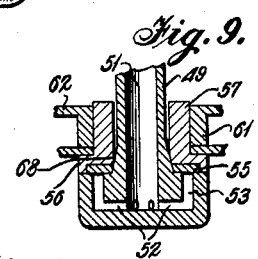
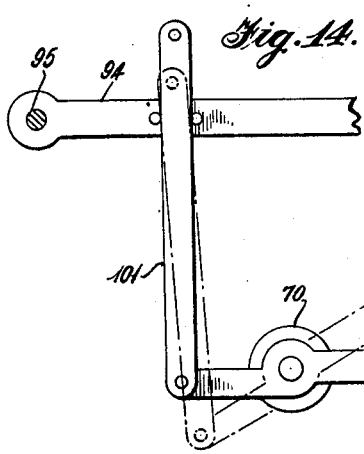
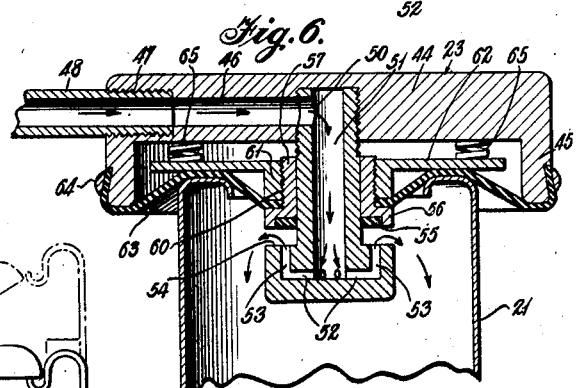
Inventor
John S. Morrel
By James P. Burns
Attorney Aug. 25, 1942.　　　　J. S. MORREL　　　　2,294,198
VOLUME MEASURING APPARATUS
Filed Jan. 19, 1939　　　　3 Sheets-Sheet 3
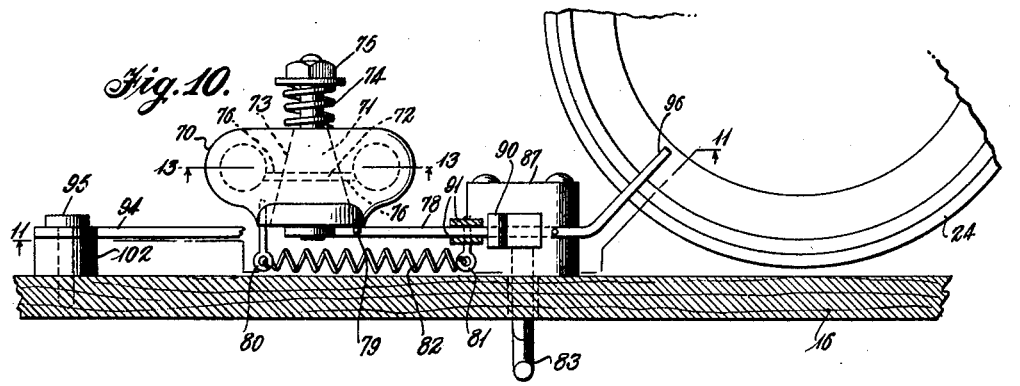
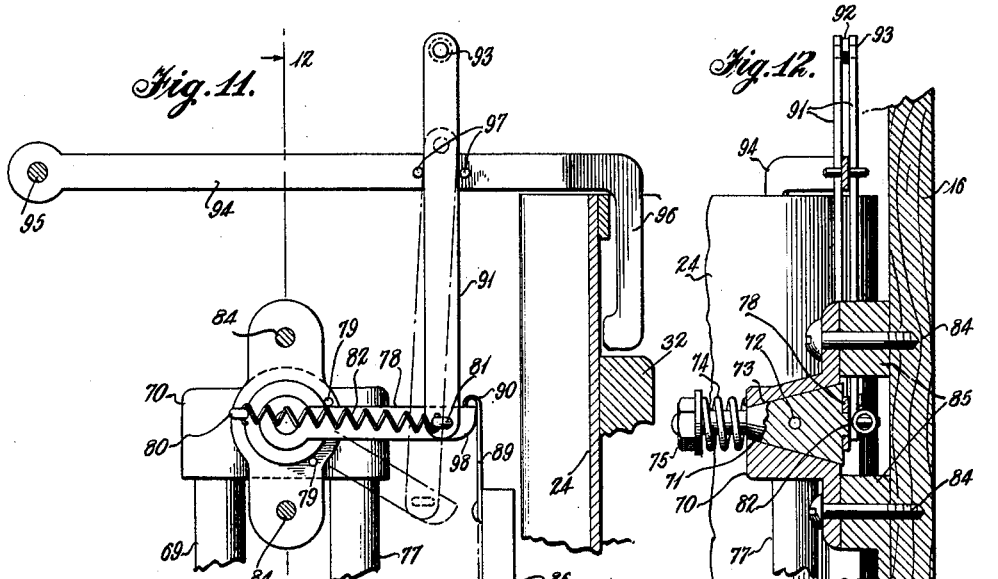
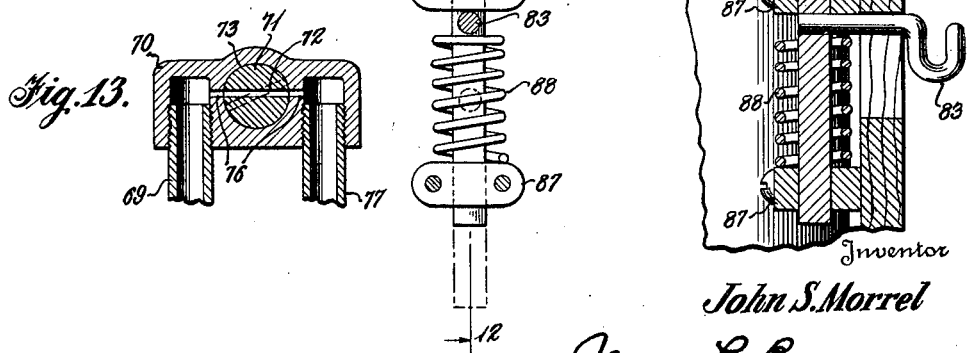
Inventor
John S. Morrel
By Jnas P. Burns
Attorney Patented Aug. 25, 1942

2,294,198

UNITED STATES PATENT OFFICE 2,294,198

VOLUME MEASURING APPARATUS

John Smylie Morrel, Nashville, Tenn.

Application January 19, 1939, Serial No. 251,842

5 Claims. (Cl. 73—290)

This invention relates to an improved measuring device. More particularly, it relates to an apparatus for accurately measuring the volume of the unfilled space in a container.

The primary object of my invention is to provide a simple and durable apparatus which utilizes the change in volume of the air or gas occupying the space in a container which is empty or but partially filled by liquids or solids, when such air or gas is subjected to a known pressure change, to ascertain the amount of liquid or solid which will be required to entirely fill the container.

Another object of my invention is to provide a device which will give the operator an accurate and direct reading of the amount of liquid in terms of gallons, for example, which will be required to completely fill, or to finish filling any given container.

Another object of my invention is to provide means for automatically resetting such a device for further use after each measurement has been taken.

Another object of my invention is to provide a measuring device with which very accurate and satisfactory measurements can be taken by persons having no knowledge of its principle of operation.

Another object is to provide a measuring device of simple and sturdy design thus permitting it to be manufactured at a low cost.

Briefly, the apparatus contemplated by my invention consists of a chamber adapted to hold a predetermined initial quantity of gas at a predetermined initial pressure and so constructed that any change in the quantity of gas therein is accompanied by an immediate alteration in volume of the chamber which is just sufficient to restore the pressure within the chamber to its initial value. Suitable means are also provided for indicating the magnitude of the alteration in volume of the chamber. A suitable appliance is provided for first sealing the vessel whose capacity is to be ascertained at a pressure different from the initial pressure within the chamber and then opening communication between the vessel and the chamber. The pressure at which the vessel is sealed will normally be atmospheric pressure and the initial pressure within the chamber will be slightly above or below atmospheric pressure. When communication is established between the chamber and the vessel, there follows at once an equalization of pressure and the resultant pressure in both vessel and chamber will be that pressure which initially existed in the chamber. The accompanying alteration in volume of the chamber is obviously exactly equal to the alteration in volume of the gas originally occupying the otherwise empty space in the vessel and the latter alteration is therefore exhibited by the indicating means referred to above.

If:

V = volume of the unfilled portion of the vessel,
P = initial pressure of the gas in the vessel (normally atmospheric pressure),
P+ΔP = pressure of gas within the chamber, and
ΔV = change in volume of the chamber, these quantities are related by the well-known equation $$VP = (V + \Delta V)(P + \Delta P)$$

where ΔP is positive or negative according as the initial pressure in the chamber is greater or less than that in the vessel, and ΔV is of course opposite in sign to ΔP.

Solving this equation for V, we have $$V = -\left(1 + \frac{P}{\Delta P}\right) \times \Delta V$$

This result is equally valid whether the chamber be designed for an initial pressure greater or less than atmospheric pressure, provided only that the appropriate signs be given to ΔP and ΔV, and the apparatus itself may readily be modified to operate on either principle. Since only the magnitudes, and not the signs, of the factors $$1 + \frac{P}{\Delta P}$$

and ΔV are essential to any further computation, these may be treated as essentially positive; care being taken, however, to use the proper sign for ΔP in computing the numerical value of the first factor. In short, if ΔV be taken to represent merely the magnitude of volume change of the chamber, the relation between V and ΔV may be exhibited mathematically as $$V = \left(1 + \frac{P}{\Delta P}\right) \times \Delta V$$

whence, P and ΔP being known initially and ΔV being shown by the indicating means referred to already, the desired value of V, the required volume, can easily be computed. However, since P and ΔP are sensibly constant for any one chamber, and since the last equation shows V to be proportional to ΔV for fixed values of P and ΔP, this computation may be rendered unnecessary by merely calibrating the indicating means to read V directly in terms of any convenient units of volume. This being done, the apparatus can be employed to ascertain the unfilled volumes of any number of vessels in succession, provided merely that the chamber is restored to its initial volume between successive applications. As will be explained later, means can be provided for doing this resetting automatically, so that successful use of the apparatus does not necessitate any knowledge of the principles involved, or any especial skill, on the part of the operator.

I shall now proceed with a detailed description of the preferred form of my invention which is illustrated in the accompanying drawings wherein, Figure 1 is a front elevation view of my apparatus showing it attached to a receptacle to be measured and indicating by dotted lines the position of the attaching means when the apparatus is not in use;

Figure 2 is a front elevation view of the device with its front cover removed;

Figure 3 is a cross sectional view looking in the direction of the arrows along the lines 3—3 of Fig. 2;

Figure 4 is a detail sectional view of a connection adapted to seal the mouth of the receptacle to be measured;

Figure 5 is a view taken in the direction of the arrows along the line 5—5 of Fig. 4;

Figure 6 is another cross sectional view of the structure shown in Fig. 4, in operative position over the mouth of a receptacle;

Figure 7 is a view taken along the line 7—7 of Fig. 4 and looking in the direction of the arrows;

Figure 8 is a view taken along the line 8—8 of Fig. 4 and looking in the direction of the arrows;

Figure 9 is a cross sectional view showing a slightly modified form of valve structure for use with the connection shown in Fig. 4;

Figure 10 is a detail plan view partly in cross section showing the automatic resetting means for my apparatus;

Figure 11 is an elevational view taken in the direction of the arrows along the line 11—11 of Fig. 10;

Figure 12 is a cross sectional view taken along the line 12—12 of Fig. 11 in the direction of the arrows;

Figure 13 is a cross sectional view taken in the direction of the arrows along the line 13—13 of Fig. 10; and Figure 14 is an elevational view of certain operating parts of the resetting mechanism in slightly modified form.

For purposes of clarity, like reference characters are used to designate like parts in each of the views.

The reference numeral 15 designates my measuring device in its entirety. The numeral 16 designates a cabinet within which most of the mechanism of the device is enclosed. This cabinet is provided on its front face with a dial 17, an indicator 18, both of which are visible through a transparent glass plate 19. A flexible hose 20 extends from the bottom of the cabinet 16 to the mouth 21 of any vessel 22 having an unfilled space therein, the volume of which it is desired to measure. The hose 20 is provided at its free end with a novel sealing and valve structure 23, the operation and detail construction of which will be described below. The cabinet 16 is designed to be mounted in the upright position shown in Fig. 1 upon any suitable support, not shown.

A cylinder 24 is mounted vertically within the cabinet 16 by means of securing screws 25. The lower end of the cylinder is closed by a base plate 26 which forms an airtight joint therewith. The base plate 26 is provided with a threaded opening 27 into which is screwed a T-shaped coupling 28. The branch 29 of the coupling 28 is provided with any suitable airtight valve 30 for use when resetting which will be described later, while the branch 31 makes an airtight connection with the flexible hose 20.

A piston 32 is mounted for vertical reciprocation within the cylinder 24. Mounted on the piston 32 is a leather or other suitable type packing 33 to prevent leakage of air past the piston. The piston is partially supported by means of an inextensible but flexible cord or wire 34 which is fastened at one end through an eye 35 on the piston 32 and extends vertically upward over a grooved drum 36. The opposite end of the cord 34 is attached to a counterweight 37 having guide holes 38 extending through it at points near its outer edges (see Fig. 3). Two parallel wires 39 are tightly strung from the top to the bottom of the cabinet 16 and extend through the holes 38 in the counterweight 37 to furnish a guide therefor and to thus prevent swaying of the counterweight. If desired, the frictional engagement between the cord 34 and the drum 36 may be increased by giving the cord several revolutions about the drum.

The drum 36 is keyed to a shaft 40 which is supported in bearings 41 and 42. The shaft 40 extends through bearing 42 which is fastened to the back of the dial 17 and also extends through the dial and carries the pointer 18. The pointer 18 rotates with the shaft and therefore with the drum 36.

The cylinder 24 is open at its upper end to permit access of atmospheric pressure to the top of the piston 32. The cylinder is also provided with a side vent 43, for a purpose which is explained later.

The sealing and valve structure 23 (Figs. 4 to 8) is designed to perform the dual purpose of first sealing the mouth of the receptacle to be measured and, second, to permit compressed air from the cylinder 24 to flow through tube 20 into the receptacle 22 after its mouth has been sealed. The structure 23 consists of a body portion 44 having a depending annular flange 45 and is machined to provide a passageway 46. The passageway 46 is threaded near its outer end as shown at 47 for engagement with a nipple 48. The other end of the nipple 48 forms an airtight connection with the flexible tube 20. A tube-like member 49 is screwed into a hole in the center of the body portion 44 and is provided with a side vent 50 which places the interior of the tube in open communication with the passageway 46. At its lower end, the tube-like member 49 is enlarged and is machined in a manner best shown in Figs. 7 and 8. As shown in Fig. 8, the central passageway 51 of the tube-like member 49 has extending therefrom radial passageways 52 which then turn at right angles to form the exit passageways 53 shown in Fig. 7. The shoulder-like surface 54 of the member 49 is ground smooth to provide a suitable seat for the annular ring of packing material 55 which is embedded in a flange 56 of a collar 57 surrounding the tube-like member 49. The body of the collar 57 is provided with external threads which are adapted to engage internal threads of a second collar 61 provided with a wide flange 62 at its upper end. Interposed between the flange 56 of the collar 57 and the body of the collar 61 is an elastic diaphragm 63 having a central opening through which the body of the collar 57 extends.

The diaphragm 63 is preferably made of rubber sheeting or similar elastic material, and has its outer edge secured to the annular projection 45 by means of a wire hoop 64. When the valve is in its normally closed position, the packing 55 is securely held against the surface 54 to thereby close the passageways 53 by means of coil springs 65 having one end embedded in recesses 66 of the body portion 44 and the other end bearing on the wide flange 62 of the collar 61. The valve is clearly shown in its closed position in Fig. 4.

The operation of the sealing and valve structure 23 is as follows. The diaphragm side of the valve is placed over the mouth of the vessel to be measured and is pressed downwardly as shown in Fig. 6. At the first slight pressure against the mouth 21 of the receptacle, the diaphragm 63 comes into contact with the entire periphery of the mouth 21 and effectively seals the vessel to prevent passage of air either into or out of the vessel. Upon further pressure, the diaphragm 63 is depressed until it contacts the wide flange 62. Upon still further pressure, the flange 62 will be depressed against the action of the coil springs 65 and will carry with it the collar 61, the collar 57, and the packing material 55. This will open the passageways 53 and permit air from the tube 20 to pass into the receptacle 22 through the mouth 21 thereof.

The sealing and valve structure 23 may be provided with a ring 67 to permit its suspension from a hook 83 extending from the cabinet when not in use.

In the modification shown in Fig. 9, instead of the tube-like member 49 being of uniform cross section above the shoulder surface 54, it is tapered slightly as shown at 68 and the central passageway of the collar 57 is given a corresponding taper. This tapered fit causes the collar 57 to seat accurately when the valve is closed and yet permits a loose fit between the tube 49 and the collar 57 when the valve is open. The purpose of the loose fit is to enable the collar to move slightly in a direction oblique to the axis of the tube 49 so that the diaphragm 63 will remain in sealing contact with the mouth of the receptacle even though the pressure on the device is not centrally applied.

For purposes of illustrating one use to which my apparatus is particularly suited, and not by way of limitation, I will describe its operation when being used to measure the quantity of gasoline required to fill the fuel tank of a motor vehicle. The fuel tanks of most motor vehicles have long curved filling spouts or are baffled in such manner as to make it impossible for an attendant to see the liquid level of the gasoline in the tanks, and he cannot, therefore, even estimate the quantity of gasoline which will be required to fill the tanks. Liquid level gauges on the instrument boards of motor vehicles leave much to be desired in the way of accuracy even when functioning properly. By the use of my device, it will be possible for an attendant to inform a motorist in advance, the exact quantity of gasoline which will be required to fill the tank. This information is obtainable in a very few seconds and appears on a dial which is visible not only to the attendant, but to the motorist as well.

With the cabinet 16 suspended preferably at or near the gasoline dispensing pump and in the position shown in Fig. 1, the device is ready for use. At this time the piston 32 and the counterweight 37 will be in the position shown by dotted lines in Fig. 2. The valve of the structure 23 will be closed and the cylinder 24 and hose 20 will be filled with air at the predetermined pressure caused by that portion of the weight of the piston 32 which is not balanced by the counterweight 37. The piston 32 is preferably sufficiently heavier than the counterweight 37 to maintain a pressure of approximately one-tenth atmosphere on the gas within the cylinder although this pressure is not critical and may be varied within wide limits. With the piston 32 in the position shown by the dotted lines in Fig. 2, the pointer 18 will be set at zero on the dial 17.

In operation the cap is removed from the mouth of the fuel tank desired to be measured and since the fuel tank is then in open communication with the atmosphere, the air contained in its unfilled space will be at atmospheric pressure; that is, approximately 15 pounds per square inch. The air within the cylinder 24 will have a relative pressure of one-tenth atmosphere, or 1.5 pounds per square inch which is equal to an absolute pressure of approximately 16.5 pounds per square inch. The valve 23 is then placed over the mouth of the fuel tank and is pressed down until it assumes the position shown in Fig. 6. It will be noted that when valve 23 is in this position, the fuel tank is sealed from the atmosphere and that the air from the cylinder 24 and the tube 20 can escape into the tank. Due to the opening of the valve 23, the piston 32 will descend in the cylinder 24 until it assumes the position shown, for example, by the full lines in Fig. 2. In this position, the pressure within the fuel tank and the cylinder have become equal and this pressure value is the same as that which originally existed in the cylinder. The air which previously existed in the fuel tank at atmospheric pressure will, of course, have undergone an increase in pressure with a corresponding reduction in volume. It is this reduction in volume of the air within the tank which permits the descent of the piston 32, and the displacement caused by the descent of the piston will, of course, be equal to this reduction in volume. The descent of the piston 32 causes rotation of drum 36, shaft 40, and moves the pointer 18 on the dial 17. When the dial has been carefully calibrated according to the well known equation given above, the pointer 18 will indicate the exact quantity of gasoline required to fill the fuel tank. This is indicated by the dotted lines in Fig. 2 as ten gallons.

The calibration of the dial is accomplished in the following manner by the use of the fundamental equation recited above, namely:

$$V = \left(1 + \frac{P}{\Delta P}\right) \Delta V$$

In this equation, V represents the volume of the unfilled space within the fuel tank, the magnitude of which it is desired to measure. P represents the absolute pressure of the air which occupies the volume V when the fuel tank is open to the atmosphere and the value of P will therefore be atmospheric pressure or approximately 15 pounds per square inch. ΔP represents the increase in the air pressure within the fuel tank from the atmospheric value P to the pressure value existing in the fuel tank after communication has been established with the cylinder. ΔP is therefore equal to the difference between the pressure exerted on the air in the cylinder by the piston and atmospheric pressure and is consequently equal to the relative pressure (pressure above the atmospheric value) of the air in the cylinder. The value of ΔP is therefore dependent on the weight of the piston 32. The weight of the piston is, of course, constant and hence the value of ΔP will be constant for any particular piston. ΔV represents the reduction in volume of the air originally within the fuel tank when its pressure increases from P to P+ΔP due to the establishment of communication with the cylinder. It will be apparent that this reduction in volume (ΔV) is equal to the displacement of the piston 32 which is necessary to bring about the increase in pressure from P to P+ΔP. The displacement of the piston 32 is equal to the cross sectional area of the cylinder 24 multiplied by the distance through which the piston 32 travels in bringing about the above indicated pressure change within the fuel tank. The value of ΔV may therefore be indicated by the equation:

$$\Delta V = \pi R^2 L$$

wherein R denotes the radius of the cylinder 24 and L represents the distance travelled by the piston in accomplishing the pressure change within the fuel tank.

By substituting the above value of ΔV in the fundamental equation, it becomes:

$$V = \left(1 + \frac{P}{\Delta P}\right) \pi R^2 L$$

Since for any particular apparatus the values of P, ΔP, π and R² are constant, the equation may be rewritten as:

$$V = SL$$

wherein S represents the constant for the particular apparatus and is equal to:

$$\left(1 + \frac{P}{\Delta P}\right) \pi R^2$$

V is therefore equal to L multiplied by a constant which is determined by the design of the apparatus. If the lengths of L and R are given in inches, the value of V in gallons will be:

$$V = \frac{SL}{231}$$

since 231 cubic inches is equal to one gallon.

By the use of this last equation, the value of S for the particular apparatus having been ascertained, it is a matter of simple design to arrange the numerals indicating gallons on the dial in such manner that the pointer will indicate the proper value of V for any piston displacement. If the value of L in the last equation is taken as the distance which the piston travels in descending from its position after resetting (shown by dotted lines in Fig. 2) to the bottom of the cylinder, and the equation solved, the resulting value will be the maximum value of V, or the maximum number of gallons which can be measured with the particular apparatus. The periphery of the dial should then be divided into the number of equal divisions indicated by this maximum value of V and these divisions numbered consecutively as shown in Fig. 1.

It is then only necessary to compute the diameter of the drum 36 which will cause the pointer carried thereby to make one complete revolution of the dial while the piston travels its maximum operative stroke. This diameter is ascertained by using the maximum operative value of L in the following equation wherein d indicates the diameter of the drum:

$$d = \frac{L}{\pi}$$

The pointed 18 should be set at zero on the dial when the piston 32 is at the upper end of its operative stroke, which position it will occupy after resetting. If the calibration has been carried out as above outlined, the pointer will accurately indicate on the dial the number of gallons required to fill any container upon which the apparatus may be used. The dial may, of course, be further divided to also indicate quarts and pints, if desired.

After the use of the apparatus for measuring the volume of the unfilled portion of a particular vessel, it is, of course, necessary to reset the device for the next measurement. This is accomplished by passing air under pressure into the cylinder 24 by way of the branch 29 of the coupling 28 after the valve 23 has been removed from the fuel tank and is therefore closed. Air is passed into the cylinder 24 until the piston 32 rises above the level of the air vent 43. The supply of air is then stopped and the valve 30 will, of course, prevent the escape of air from the bottom of the cylinder. Air will, however, escape through the air vent 43 until the piston 32 descends to close this vent. The piston will then continue to descend until the predetermined pressure of, for example, one-tenth atmosphere, which is sufficient to support the uncounterbalanced portion of the weight of the piston, is obtained in the cylinder. The apparatus is then ready for reuse.

In practice I have found it advisable to use automatic means for resetting the apparatus. This is accomplished by means of the mechanism shown in detail in Figs. 10 to 14, the operation of which will now be explained in detail.

This automatic resetting mechanism preferably embraces a source of air supply under pressure, a conduit for conveying air from such supply to the cylinder 24 below the piston 32, a valve structure and operating means therefor associated with the cylinder 24 and piston 32 mounted within the cabinet 16.

Referring now to Figs. 1 and 13, the pipe 69 is connected to any suitable source of compressed air, not shown, and communicates with one side of a rotary plug valve indicated generally by the reference numeral 70. This valve has a cone-shaped rotary plug 71 having a way 72 machined diametrically through its mid-portion. The plug 71 is seated in a correspondingly cone-shaped seat 73 (Fig. 12) in the valve body and is held securely seated by means of a spring 74 and a securing nut 75. The valve body has channels 76 in cooperative relationship with the channel 72 in the rotary plug 71. The channels 76 connect the pipe 69 with the valve plug and the valve plug with the conduit 77 which may be suitably connected with the branch 29 of the coupling 28 at the bottom of cylinder 24. The valve 30 is, of course, unnecessary when the automatic resetting means is used.

The valve 70 is shown in open position by the full lines in Fig. 13, while the dotted lines in the same figure indicate the valve in closed position. The valve is operated by means of a lever 78 (Fig. 11). The motion of the lever 78 is limited by means of pins 79 extending from the valve body. Anchoring pins 80 and 81 are carried respectively by the valve 70 and the lever 78. A coil spring 82 extends between these two pins which are so arranged that the distance between them is least when the lever 78 is in either of its extreme positions which are indicated by the full and dotted lines respectively, in Fig. 11. The spring 82 functions to retain the lever 78 in either its closed or open position until it is intentionally moved by means of the mechanism about to be described.

Immediately after use of the apparatus, the piston 32 will occupy the position shown, for example, by the full lines in Fig. 2; the lever 78 will occupy the full line position in Fig. 11 with the valve 70 closed. Resetting of the mechanism is accomplished by lowering the hook 83 which extends through the wall of the cabinet 16. The lowering of the hook 83 may be done either by simply depressing it with the finger or by suspending the valve 23 from it by means of the ring 67, this valve having sufficient weight to depress the hook 83. It will be noted that the valve 70 is secured in spaced relationship with the wall of the cabinet 16 (Figs. 10 and 12) by means of securing screws 84 and spacers 85, and that the lever 78 lies between the valve body and the cabinet wall. The inner end of the hook 83 is attached to a vertical slide member 86 which is mounted for reciprocation in guides 87. A coil spring 88 is interposed between the lower guide 87 and the inner end of the hook 83 and tends normally to hold the slide member 86 in the position shown in full lines in Fig. 11; i. e., with valve 70 closed. The upper end of the slide member 86 is provided with a flat spring member 89 having at its upper end a hook 90 for engagement with the end of the lever 78. When the hook 83 is lowered, the sliding member 86 will descend and the spring member 89 and hook 90 will depress the lever 78 to the position shown by dotted lines in Fig. 11, thereby opening the valve 70. The hook 90 is freed from engagement with lever 78 at the lower position of the latter which, however, is held in that position by spring 82.

With the valve 70 in open position, compressed air will flow from the source of supply, not shown, through the pipe 69, the valve 70, and the pipe 77 to the bottom of the cylinder through the coupling 28. This compressed air flowing into the cylinder 24 below the piston 32 will cause the piston to rise. The lever 78 has connected to it by means of the pin 81 parallel links 91, best shown in Figs. 11 and 12. These parallel links are held in spaced relationship at their upper ends by means of a sleeve 92 and a pin 93. An L-shaped lever 94 is pivoted to the cabinet wall by means of a screw 95 and is spaced from the wall by means of a sleeve 102. The lever 94 extends from its pivot between the parallel links 91 over the top of the cylinder 24 and has a leg 96 depending into the cylinder.

When the valve 70 is open and the lever 78 is in the position shown by dotted lines in Fig. 11, the sleeve 92 separating the parallel links 91 will bear against the top of the L-shaped lever 94. When compressed air continues to flow into the cylinder below the piston 32, the piston will rise until it contacts and raises the depending leg 96 of the lever 94, thus causing this lever to move about its pivot 95. Rotation of the lever 94 will raise the parallel links 91 which are held against movement along the lever 94 by pins 97. The parallel links 91 will carry with them the lever 78 and continued rising of the piston 32 will therefore close the valve 70.

Upon closing of the valve 70, compressed air will cease to flow into the cylinder 24; the piston 32 will stop rising and will settle back to the position shown, for example, by dotted lines in Fig. 2, the L-shaped lever 94 will resume its position shown in Fig. 11, but will not carry downward with it the parallel links 91 which, due to the action of spring 82, will remain in the position shown in full lines in Fig. 11. The valve 70 will therefore remain closed until it is again necessary to reset the apparatus.

If the resetting operation is begun by depressing the hook 83 with the finger, the hook may be immediately released and the sliding member 86 and hence the spring member 89 and hook 90 will return under the influence of coil spring 88 to their upward position without closing the valve 70 which will be held open by spring 82. If, however, the resetting operation is commenced by hanging the valve 23 on the hook 83, the hook will be held down until the valve 23 is again removed. This may well be long after the resetting operation has been completed and after the lever 78 has resumed its upward position. To enable the hook 90 to return to operative position above the lever 78 upon removal of the valve 23 from the hook 83, the outer end of the lever 78 is given a cam shape as shown at 98. As the sliding member 86 rises, the hook 90 will strike the sloping surface 98 and will be deflected until it reaches the limit of its upward movement and passes the top corner of the lever 78 when it will snap into the position shown in Fig. 11.

For some purposes it may be desirable to reset the apparatus by the removal of the valve 23 from the hook 83. This has the advantage of permitting the valve to be replaced on the hook without the loss of the information obtained by a previously taken reading. The accomplishment of this purpose requires slight changes in certain parts of the resetting mechanism and I have shown these modifications in Fig. 14. In this modification, the closed and open positions of the valve 70 are modified, the closed position being shown by full lines in Fig. 14, and the open position by dotted lines. The sliding member 86 has at its upper end a flat spring member 99 similar to the spring member 89 but is provided at its upper end with a double curve and is adapted to cooperate with the lower edge of a modified valve actuating lever 100. This valve actuating lever 100 extends beyond the valve 70 and is provided with parallel links 101 which are identical with the links 91. When the valve 23 is suspended from the hook 83, the sliding member 86 will be in the position shown by the full lines in Fig. 14, and the valve actuating lever 100 will also be in the position shown by the full lines, the valve being closed. Upon removal of the vlave 23 from the hook, the coil spring 88 will cause the sliding member 86 to rise and the spring 99 will move the valve actuating lever 100 to open the valve. The mechanism will then assume the position shown by dotted lines in Fig. 14 and the valve 70 will be open, permitting compressed air to flow into the cylinder 24 and to raise the piston 32 as heretofore described. The rising of the piston 32 will raise the L-shaped lever 94 which will in turn raise the parallel links 101 to close the valve 70. Upon replacing the valve 23 on the hook 83, the sliding member 86 will descend and the spring 99 will snap into the position shown by the full lines in Fig. 14.

It will thus be seen that I have provided a measuring apparatus which, though simple and durable, will give accurate results. In using my device, no computation is necessary and it can therefore be used by operators having no knowledge whatever of the principle of its operation. The portability of the valve 23 and the fact that this valve can be used on tanks having openings of various sizes renders the apparatus particularly useful for ascertaining the amount of gasoline which a motor vehicle fuel tank will hold. Such information obtained by the use of my device will not only prevent the waste of gasoline by overfilling the fuel tank, but will enable station attendants to increase their sales by informing the motorist in advance of the exact amount of gasoline which will be required to fill his tank. I have ascertained that readings may be taken with my device in a very few seconds and that by the use of the automatic resetting means, separate readings may be taken every 20 to 30 seconds.

While I have shown and described the preferred embodiment of my invention, it will be apparent that various modifications may be resorted to without departing from the broad scope of the invention as defined in the annexed claims.

In the specification and claims, the term "fluid" means any fluid which is substantially compressible and which follows Boyle's law with reasonable accuracy through narrow ranges of pressure change. By the term "unfilled space", is meant that space in the vessel which is occupied only by the compressible fluid. The term "cylinder" is meant to designate any chamber, irrespective of cross-sectional shape, in which a piston may be closely fitted and adapted to reciprocate.

Having thus described my invention, I claim:

1. An apparatus for measuring the unfilled space within a vessel comprising a cylinder having vertical walls and closed at its lower end, a piston mounted for vertical reciprocation in said cylinder, said piston including means to prevent the passage of air between the piston and the walls of said cylinder, means for introducing compressed air into said cylinder below said piston to thereby raise the piston, an air vent in the wall of said cylinder near its upper end to permit the escape of air from the cylinder when said piston rises above said vent, a conduit leading from the closed end of said cylinder to the mouth of the vessel to be measured, means at the free end of said conduit for sealing the mouth of said vessel, a valve for establishing communication between the interior of said vessel and said cylinder to permit compressed air within the cylinder to flow into the vessel, and means responsive to the movement of said piston effected by the reduction of the volume of compressed air within the cylinder to indicate the volume of the unfilled space within the vessel.

2. An apparatus for measuring the unfilled space within a vessel comprising a cylinder having vertical walls and closed at its lower end, a closely fitting weighted piston adapted for vertical reciprocation therein, means for introducing compressed air into the closed end of said cylinder below said piston to thereby raise the piston, valve means in the walls of said cylinder opened to permit escape of air from said cylinder by raising of said piston and closed by descent of said piston to a predetermined position, said piston when at or below said predetermined position exerting a constant pressure on the air below it, means for conducting compressed air from said cylinder into the unfilled space of the vessel to be measured, which unfilled space contains a constant and known initial pressure, and means responsive to the movement of said piston effected by the reduction of the volume of compressed air within the cylinder to indicate the volume of the unfilled space within the vessel.

3. An apparatus for measuring the unfilled space within a vessel comprising a cabinet, a cylinder located within said cabinet, said cylinder being closed at one end and having a closely fitting piston adapted to reciprocate therein and capable of exerting a constant predetermined pressure on air confined between said piston and the closed end of said cylinder, a vent in the wall of said cylinder near its open end for limiting the maximum volume of air which said piston can compress, a flexible conduit leading from the closed end of said cylinder through said cabinet to the mouth of a vessel having unfilled space the volume of which it is desired to measure, said conduit having a coupling valve assembly for first sealing the mouth of said vessel and subsequently opening communication between said cylinder and the unfilled space in said vessel to thereby permit compressed air in said cylinder to flow into said vessel, and means responsive to the movement of said piston effected by the reduction of the volume of compressed air within the cylinder to indicate the volume of the unfilled space within the vessel.

4. Apparatus for measuring the volumetric capacity of the unfilled space in a vessel, comprising a cylinder having vertical walls and closed at its lower end, a weighted piston closely fitting the inner walls of said cylinder and adapted for vertical reciprocation therein, a flexible strand secured to said piston and extending upwardly and around a horizontally disposed rotatable shaft, said piston exerting a predetermined constant pressure on fluid confined between said piston and the lower end of said cylinder irrespective of the volume of said fluid, valve means controlled by the position of said piston for securing a predetermined volume of confined fluid in said cylinder at said predetermined pressure, a conduit leading from the lower end of said cylinder to the mouth of a vessel having a space of unknown volumetric capacity which is occupied by fluid at atmospheric pressure, means associated with said conduit for sealing the mouth of said vessel and for placing the confined space in said cylinder in open communication with the interior of said vessel whereby flow of compressed fluid from said cylinder into said vessel is accompanied by a predetermined movement of said piston with a consequent rotation of said horizontally disposed shaft, and means operatively connected with said shaft and responsive to rotation thereof to indicate the volume of the unfilled space in said vessel.

5. An apparatus for measuring the volume of the unfilled space within a vessel comprising a cylinder closed at one end, a closely fitted piston adapted for reciprocation within said cylinder and exerting a predetermined constant pressure on a fluid between said piston and the closed end of said cylinder irrespective of the volume of said fluid, valve means controlled by the position of said piston for securing a prescribed initial volume of fluid within said cylinder at said predetermined pressure, a conduit leading from the closed end of said cylinder to the mouth of a vessel having an unfilled space therein of unknown volume, means at the free end of said conduit for sealing the mouth of the vessel, a valve for opening communication between the interior of the vessel and said cylinder to thus permit an equalization of pressure in said cylinder and said vessel and means responsive to movement of said piston effected by alteration of volume of fluid within said cylinder to indicate the volume of the unfilled space within said vessel.

JOHN SMYLIE MORREL.